Nov. 27, 1962
G. MILDH
3,065,844
TRANSPORTING MEANS FOR PULVEROUS OR
GRANULAR MATERIALS
Filed Oct. 20, 1960
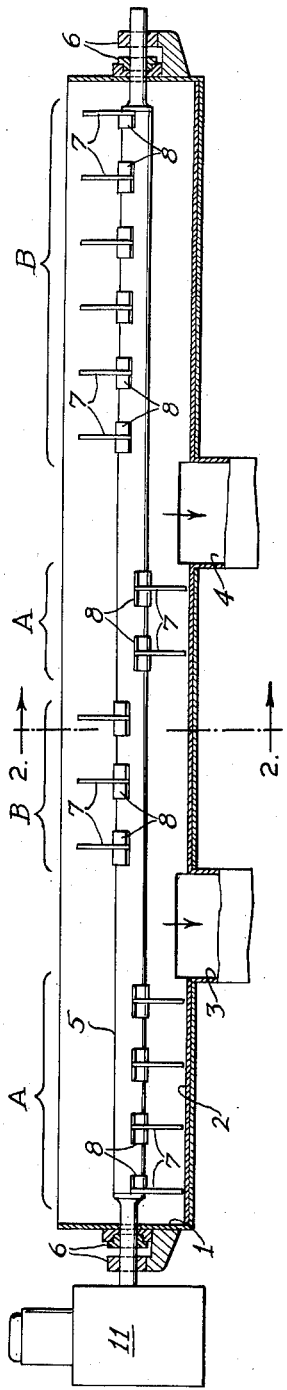
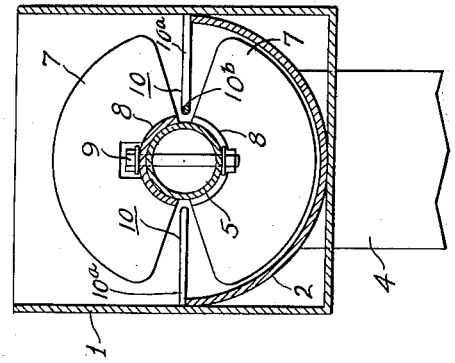
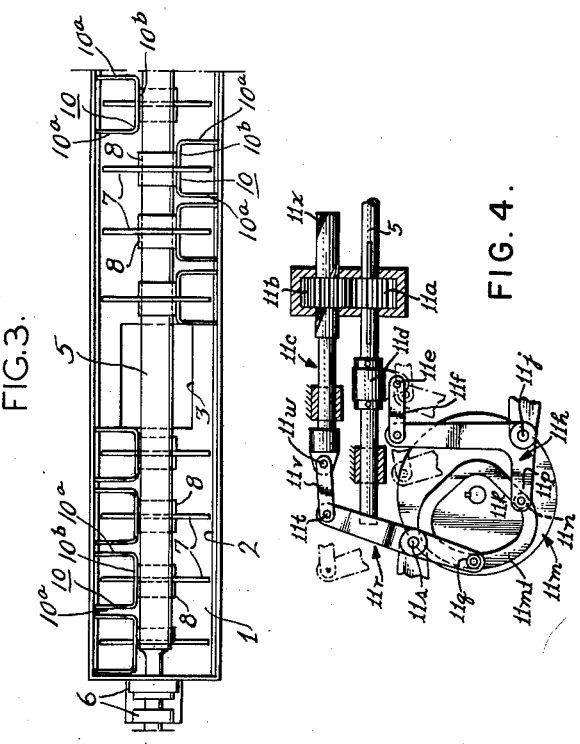
INVENTOR:
GÖSTA MILDH
BY
Howson & Howson
ATTYS.

United States Patent Office 3,065,844
Patented Nov. 27, 1962

3,065,844
TRANSPORTING MEANS FOR PULVEROUS OR GRANULAR MATERIALS
Gösta Mildh, Vattersnas, Sweden, assignor to Aktiebolaget Svenska Flaktfabriken, Stockholm, Sweden
Filed Oct. 20, 1960, Ser. No. 63,839
Claims priority, application Sweden Oct. 21, 1959
4 Claims. (Cl. 198—224)

The present invention relates to a conveyor for pulverulent or granular materials, which is of the kind comprising a conveying trough having a semicircular bottom formed with one or more discharge openings, and a dragging member disposed within said conveying trough.

Conveyors of the kind referred to above exist in a great variety of structural forms, but as regards their methods of conveying the material they may be divided into two principal types: first, those comprising dragging elements mounted on endless belts or chains, and, second, those in which the material is conveyed by means of a rotating screw or worm. The present invention, which may be said to be a combination of both types, has for its object to eliminate the drawbacks of such conveyors when used for conveying certain kinds of materials, for instance adherent materials, that is, materials having a tendency to "build up," or materials which should not suitably be subjected to compression to the extent involved in the use of a screw conveyor.

The invention solves the above-mentioned problem in a simple and reliable way and is characterised in that the dragging member comprises a plurality of dragging elements attached to an axially displaceable as well as rotatable shaft. The dragging elements are made in the form of sector-shaped sheet-metal wings having a centre angle of approximately 180° distributed along the shaft in groups at either sides of each discharge opening. The drag wings of the group at one side of each discharge opening are angularly offset by 180° relative to the drag wings of the group at the opposite side of said discharge opening. The shaft is connected to a power drive adapted to impart to the shaft an endwise reciprocatory motion, and, after completing the stroke in one sense, to turn the shaft through 180°, thereby moving the drag wings of the offset groups alternately into their operating position.

The drag wings are suitably provided with mounting flanges in a manner to enable the same to be detachably mounted on the shaft, whereby the interspacing and/or distribution of the drag wings can be adjusted.

A preferable embodiment of the invention is characterised by scraping elements disposed at either sides of the shaft at the level of its axis and so positioned that, during the turning movement of the shaft, they will be relatively spaced to embrace the drag wings to thereby remove any dust adhering to the two faces of the wings.

To enable the shaft as well as the drag wings to be cleaned, the scraping elements are suitably made in the form of staple-shaped wire brackets fastened to the side walls of the conveyor trough and each adapted to clean the opposed faces of two adjacent drag wings with its lateral legs and to clean the intervening portion of the shaft with its leg-interconnecting portion.

The invention will now be described more closely in conjunction with the accompanying drawing showing by way of example a conveyor according to one embodiment of the invention, and in which:

FIG. 1 shows a longitudinal, sectional elevation of the conveyor;

FIG. 2 shows a cross-sectional elevation taken along the line 2—2 in FIG. 1;

FIG. 3 shows a plan view of the conveyor; and

FIG. 4 is a diagrammatic partial side elevation of shaft operating means.

In the drawing, numeral 1 designates a conveyor trough comprising a semi-circularly sectioned bottom 2 having two discharge openings 3 and 4 formed therein. Disposed within the conveyor trough is a shaft 5 extending throughout the length of the trough and supported in bearings 6 provided at the ends of the trough. Attached to the shaft are a plurality of dragging elements 7 made in the form of sector-shaped sheet-metal wings having a centre angle of approximately 180°. The drag wings are arranged in equi-spaced relation throughout the length of the shaft and are divided into groups A and B at either side of each discharge opening. The drag wings in group A at one side of each discharge opening are angularly offset relative to the drag wings in group B at the opposite side of each discharge opening. In order to enable the mutual spacing or pitch and/or the distribution of the wings to be adjusted, the drag wings, in the embodiment shown, are provided with mounting flanges 8 and are detachably secured to the shaft 5 by bolts 9.

The shaft 5 is connected at one end to a power drive 11 of a known type adapted to impart to the shaft, first, an endwise or axial reciprocatory motion, and, secondly, after completing the stroke in one sense, to turn or rotate the shaft through 180°, thereby moving the drag wings of groups A and B alternately into their operating position.

In order to effect cleaning of the drag wings and shaft, there are fastened to the side walls of the conveyor trough staple-shaped wire brackets 10 which are each dimensioned and positioned in a manner to cause their lateral legs 10a to clean the opposed faces of two adjacent drag wings, and their leg-interconnecting portion 10b to clean the intervening portion of the shaft. To enable the drag wings to clear the scraper brackets when the shaft is turning, the endwise movement of the shaft must be adjusted to correspond to the interspacing of the wings.

As shown in FIG. 4, for turning the shaft, a gear 11a is splined on the shaft and driven by a gear 11b of a reciprocatory spiral splined shaft 11c, the gears being mounted in any usual way to hold them in axially fixed position. The shaft 5 is reciprocated axially, as by a clutch type collar 11d having pins 11e pivoted to a link 11f operated by an arm 11g of a bell crank lever 11h pivoted at 11j. The actions of the shaft 11c and the link 11f are coordinated in any suitable way to produce alternate turning and reciprocating movements as required. The exemplary form of such apparatus shown in FIG. 4 includes a cam shaft 11k driven by any suitable power means such as a gear box from the motor shown at the top left-hand side of FIG. 1. The cam shaft 11k has a cam plate 11m with a cam groove 11m1 which operates a cam follower 11n of an arm 11p of the bell crank 11h which reciprocates the shaft 5.

The cam groove 11m1 also operates a cam follower 11q on the lower end of a lever 11r pivoted at 11s, the other end of the lever having connected thereto by a pivot pin 11t a link 11v which at its other end is connected by a pivot pin 11w to the end of the shaft 11c. The shaft 11c does not rotate but has a spiral spline or groove 11x which cooperates with a complementary spiral spline or groove within the gear 11b to cause it to turn back and forth when the shaft 11c is reciprocated by the cam.

It will be noted that the cam groove 11m1 has concentric rest portions which produce no motion and inclined portions which produce reciprocatory motion of the cam followers. Also it will be noted that the cam followers are so located in the cam groove that one will be moved while the other rests and vice versa. The pivots 11j and 11s of the levers 11h and 11r respectively will be located axially clear of the cam plate so as not to interfere with its action. The pivots are carried by any suitable fixed supports.

If there are wiper brackets 10 in opposed relationship on both sides of the trough the conveyor shaft 5 may have consistent turning movement in either direction in successive stages of 180 degrees; if the brackets are all on one side of the trough the shaft may be turned consistently in one direction; and if the wiper brackets 10 are staggered on opposite sides of the trough, as shown, the shaft 5 will be oscillated back and forth in successive stages of 180 degrees. It will be a simple matter to drive the shaft 11c either consistently in one direction or alternately in opposite directions.

Obviously, the attachment, interspacing and distribution of the drag wings, as well as the number and positioning of the discharge openings, are susceptible of numerous variations and adaptations according to the material to be conveyed and to the local conditions without departing from the scope of the invention.

What I claim is:

1. A conveyor for pulverant or granular materials comprising a conveying trough having a semi-circular bottom formed with at least one discharge opening, a dragging member disposed within said trough, said dragging member comprising a shaft having a plurality of dragging elements attached thereto, said shaft being rotatable and axially displaceable within said trough, said dragging elements comprising sector-shaped sheet-metal wings having a center angle of approximately 180°, said drag wings being distributed along said shaft in groups at opposite sides of the discharge opening, the drag wings of the group at one side of the discharge opening angularly offset by 180° relative to the drag wings of the group at the opposite side of said discharge opening, and a power drive means adapted to impart to said shaft an endwise or axial reciprocating motion, and, after completing each stroke in one sense, to rotate said shaft through 180°, thereby moving said drag wings of the offset groups alternately into their operating positions.

2. A conveyor as claimed in claim 1, said drag wings having mounting flanges for detachable mounting on said shaft to permit adjustment of the interspacing or distribution of said drag wings.

3. A conveyor as claimed in claim 2 including scraping means disposed in said conveyor trough such that during the turning movement of said shaft said scraping means will engage said drag wings and said shaft to remove dust adhering to the faces thereof.

4. A conveyor as claimed in claim 3, said scraping means comprising staple-shaped wire brackets fastened to said conveyor trough at the sides of said shaft and at the level of the shaft axis, each of said brackets adapted to clean the confronting faces of two adjacent drag wings with its lateral legs and to clean the intervening portion of the shaft with its leg-interconnecting portion.

References Cited in the file of this patent
UNITED STATES PATENTS

| | | |
|---|---|---|
| 117,634 | Hulbert et al. | Aug. 1, 1871 |
| 1,073,425 | Lambert | Sept. 16, 1913 |
| 2,381,185 | Rogers et al. | Aug. 7, 1945 |
| 2,765,899 | Ballard | Oct. 9, 1956 |